United States Patent
Niwa et al.

(10) Patent No.: US 10,193,181 B2
(45) Date of Patent: Jan. 29, 2019

(54) PRESSURIZATION DEVICE FOR BATTERY CELLS

(71) Applicant: Nissan Motor Co., Ltd., Yokohama-Shi, Kanagawa (JP)

(72) Inventors: Yoshikazu Niwa, Kanagawa (JP); Shigeyoshi Okada, Kanagawa (JP); Mitsuru Yoshimizu, Kanagawa (JP); Katsumi Kurosawa, Kanagawa (JP); Tetsuya Aono, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 53 days.

(21) Appl. No.: 15/125,479

(22) PCT Filed: Mar. 16, 2015

(86) PCT No.: PCT/JP2015/057715
§ 371 (c)(1),
(2) Date: Sep. 12, 2016

(87) PCT Pub. No.: WO2015/141631
PCT Pub. Date: Sep. 24, 2015

(65) Prior Publication Data
US 2017/0133705 A1    May 11, 2017

(30) Foreign Application Priority Data
Mar. 17, 2014    (JP) .................. 2014-052966

(51) Int. Cl.
*H01M 10/04* (2006.01)
*H01M 2/10* (2006.01)

(52) U.S. Cl.
CPC ..... *H01M 10/0481* (2013.01); *H01M 2/1077* (2013.01); *H01M 2220/20* (2013.01)

(58) Field of Classification Search
None
See application file for complete search history.

(56) References Cited

U.S. PATENT DOCUMENTS

| | | |
|---|---|---|
| 5,786,980 A | 7/1998 | Evans |
| 2014/0170468 A1 | 6/2014 | Sasaoka |

FOREIGN PATENT DOCUMENTS

| | | |
|---|---|---|
| JP | 02-146520 A | 6/1990 |
| JP | H06290805 A | 10/1994 |
| JP | 2009004361 A | 1/2009 |
| JP | 2012-003950 A | 1/2012 |
| KR | 101181303 B1 | 9/2012 |
| WO | 2013008321 A1 | 1/2013 |

*Primary Examiner* — Wyatt P McConnell
(74) *Attorney, Agent, or Firm* — Young Basile Hanlon & MacFarlane, P.C.

(57) ABSTRACT

A pressurization device has a housing accommodating a plurality of battery cells and a plurality of spacers fixed to housing at even intervals in the thickness direction and forming bag shapes capable of expanding and contracting in accordance with air pressure. In a state in which the spacers have been contracted, each space larger than the dimensions of the battery cells in the thickness direction is maintained between adjacent spacers. In a state in which the spacers have been expanded by increasing the air pressure inside the spacers by an air apparatus, the adjacent spacers pressurize the battery cells in the thickness direction.

11 Claims, 16 Drawing Sheets

PRESSURIZATION DEVICE FOR BATTERY CELLS

CROSS REFERENCE TO RELATED APPLICATION

The present application claims priority to Japanese Patent Application No. 2014-052966, filed Mar. 17, 2014, incorporated herein its entirety.

TECHNICAL FIELD

The present invention relates to improvement of a pressurization device for pressurizing flat-shaped battery cells in the thickness direction of the battery cells.

BACKGROUND

As to a battery cell used for electric vehicles and hybrid vehicles, for example, a power generation element is sealed with a liquid electrolyte in an exterior body made of a laminated film, and the battery cell has a thin flat shape in the thickness direction of the battery cell. A positive terminal and a negative terminal are led out from a part of the peripheral edge portion of the exterior body. When this type of the battery cell is manufactured, a step for pressurizing the battery cell in a predetermined thickness direction is performed so that the liquid electrolyte is excellently permeated while discharging a gas inside the exterior body.

In addition, as a technique similar to such pressurization work of the battery cell, in Japanese Patent Application Publication H2-146520, there has been disclosed a technique for pressurizing a cell used for liquid crystal panels.

In the pressurization of battery cells, there has been known a technique in which the battery cells and spacers with a certain width are alternately arranged in the thickness direction in a pressurization device (pressurization magazine) and the whole of a plurality of these battery cells and spacers is pressurized in the thickness direction from both side of the whole of them, and thereby the plurality of the cells are simultaneously pressurized.

Here, in a case where charging is performed in a state in which the battery cells have been inserted into the pressurization device and have been fixed and pressurized, by respectively connecting the terminals of each of the battery cells to the chuck portions of a charging and discharging device, the charging is performed. Accordingly, the intervals between the plurality of the cells needs to be the same as that of the chuck portions.

On the other hand, in the battery cell for electric vehicles and hybrid vehicles, since the capacity of the battery cell differs depending on a car model on which the battery cell is mounted, the thickness of the battery cell is not one type. Here, as mentioned above, in the related art pressurization device which pressurizes the whole of the plurality of the battery cells and spacers, which are arranged alternately, from both of the side of the whole of them, since the interval between the adjacent battery cells differs depending on the thickness of the battery cells, the dimension of the whole of them in a pressurized state is changed. Consequently, the positions of the terminals of the battery cells with respect to the positions of the chuck portions of the charging and discharging device are shifted, and charging and discharging cannot be performed. Therefore, there are problems that it is necessary to prepare a different pressurization device in each type of battery cells having different thickness and, by this, an area for sorting excess magazines becomes necessary, and consequently, a manufacturing cost and the necessary area of a factory are increased and productivity is decreased.

SUMMARY

The present invention is one to provide a new pressurization device which is capable of corresponding to a plurality of types of battery cells having different thickness. That is, the present invention is a pressurization device for battery cells which pressurizes, in a thickness direction of the battery cell, a plurality of the battery cells, in each of which a power generation element is sealed with a liquid electrolyte in an exterior body made of a laminated film, having thin flat shapes in the thickness direction, the pressurization device for the battery cells having a housing accommodating the plurality of the battery cells, a plurality of spacers arranged in the thickness direction, supported by the housing and forming bag shapes which are capable of expanding and contracting in at least the thickness direction in accordance with fluid pressure of working fluid sealed inside the spacers, and a pressure supply passage used for supplying the fluid to the plurality of the spacers from a fluid pressure source.

In addition, each space larger than the dimensions of the battery cells in the thickness direction is maintained between adjacent spacers in a state in which the spacers have been contracted by decreasing the fluid pressure inside the spacers. On the other hand, the battery cells, each of which is arranged between the adjacent spacers, are pressurized in the thickness direction in a state in which the spacers have been expanded by increasing the fluid pressure inside the spacers.

According to the present invention, there is configured that the battery cells are pressurized by expanding the spacers alternately arranged with the battery cells, and thereby the positions of the battery cells (middle position in the thickness direction) with respect to the housing of the pressurization device can be obtained at the same position regardless of the thickness of the battery cells to be pressurized. With this, for example, the positions of the chuck portions of a charging and discharging device with respect to the positions of various types of the battery cells having different thickness are not shifted, and the pressurization of the battery cells using the same pressurization device can be possible. Therefore, there is no necessary to individually prepare a pressurization device in each type of the battery cells having different thickness, and thereby costs can be reduced and working efficiency is improved.

DETAILED DESCRIPTION OF THE EMBODIMENTS

Figure 1:
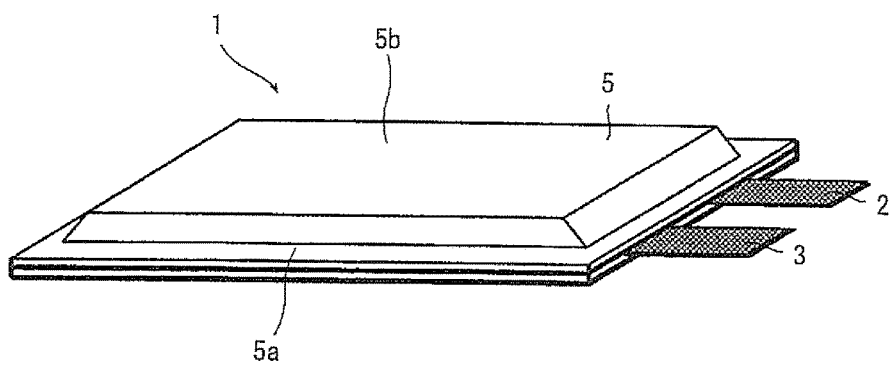
FIG. 1 is a perspective view showing a film exterior battery as a battery cell that is pressurized by a pressurization device according to one embodiment of the present invention.

In the following, the present invention is explained according to the embodiments shown in the drawings.

Figure 2:
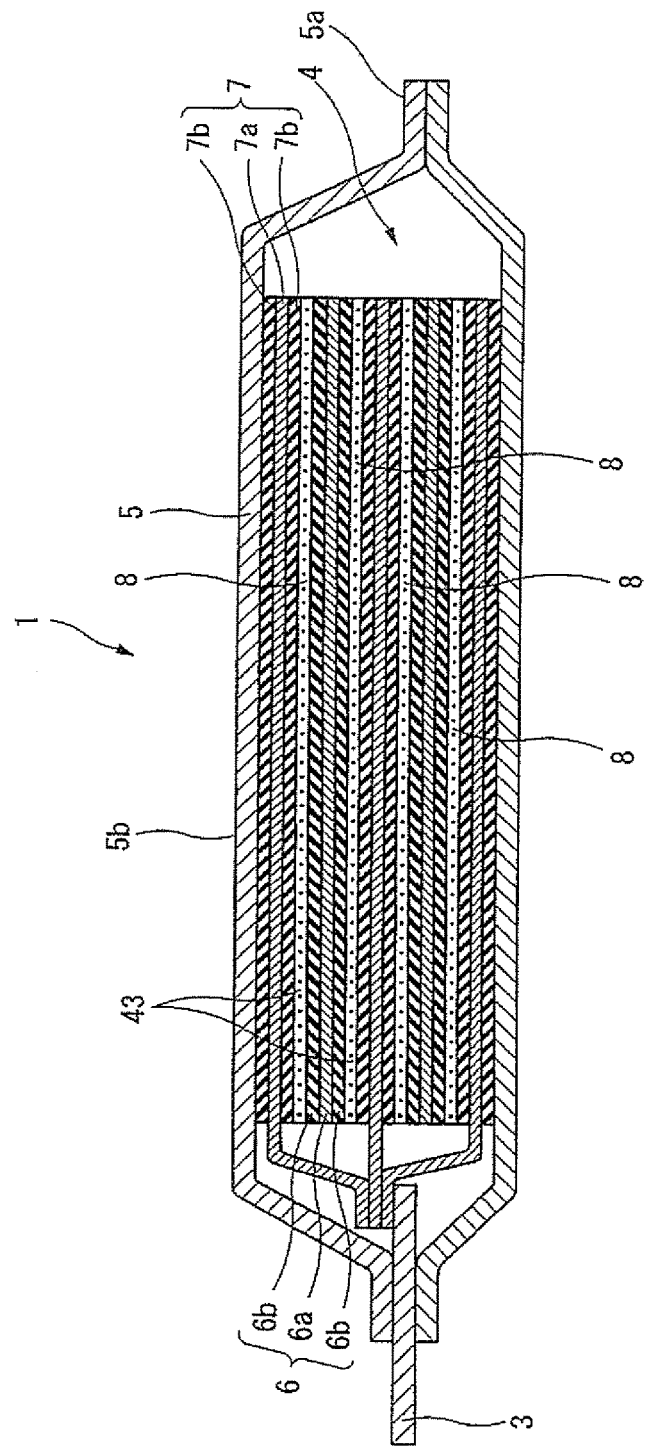
FIG. 2 is a sectional view of the film exterior battery of FIG. 1.

First, a film exterior battery as one embodiment of a battery cell that is pressurized is explained with reference to FIG. 1 and FIG. 2. This film exterior battery 1 is, for example, a lithium ion secondary battery. Film exterior battery 1 has a flat rectangular appearance shape, and a pair of thin plate-shaped terminals 2 and 3 made of conductive metal foils is provided at one end edge in the longitudinal direction of film exterior battery 1. This film exterior battery 1 is one in which rectangular electrode laminated body 4 is accommodated with a liquid electrolyte in exterior body 5 made of a laminated film. The above electrode laminated body 4 that is a power generation element is formed of a plurality of positive electrode plates 6 and a plurality of negative electrode plates 7 which are alternately laminated through separators 8. The plurality of positive electrode plates 6 are joined to positive electrode terminal 2, and, similar to this, the plurality of negative electrode plates 7 are joined to negative electrode terminal 3. Positive electrode plate 6 is one in which both of the surfaces of positive electrode current collector 6a made of a metal foil, such as an aluminum foil, are coated with positive electrode active material layer 6b. The same as this, negative electrode plate 7 is one in which both of the surfaces of negative electrode current collector 7a made of a metal foil, such as a copper foil, are coated with negative electrode active material layer 7b.

Exterior body 5 has a double structure formed of one laminated film provided under the lower surface side of electrode laminated body 4 and one laminated film provided on the upper surface side of electrode laminated body 4. The four sides of the periphery of the laminated film provided under the lower surface side and the four sides of the periphery of the laminated film provided on the upper surface side are overlapped, and heat-welded each other along the overlapped peripheral edges. In this way, peripheral edge portion 5a of the heat-welded four sides has a thin sheet shape. On the other hand, middle part 5b accommodating electrode laminated body 4 has a certain thickness that is relatively thick. When the laminated films are heat-welded, the pair of terminals 2 and 3 positioned at the short side of rectangular film exterior battery 1 is led out to the outside through the joined surface of the laminated films.

In addition, in the embodiment shown in the drawings, the pair of terminals 2 and 3 is disposed side by side at the same one end edge in the rectangular direction. However, it is also possible that positive electrode terminal 2 is disposed at one end edge in the rectangular direction and negative electrode terminal 3 is disposed at the other end edge.

The manufacturing procedure of the above film exterior battery 1 is as follows. First, in a laminating step, electrode laminated body 4 is formed by laminating positive electrode plates 6, separators 8 and negative electrode plates 7 in order, and by attaching terminals 2 and 3 by spot-welding. Next, this electrode laminated body 4 is covered with the laminated films which become exterior body 5, and three sides of the periphery of the overlapped laminated films are then heat-welded except one side. Next, the liquid electrolyte is injected into exterior body 5 through the one side which is opened and it is filled with the liquid electrolyte, following which the one side which is opened is heat-welded and exterior body 5 is made to be in a sealed state. With this, film exterior battery 1 is completed. After that, film exterior battery 1 is shipped through steps such as charging, the after-mentioned pressurization, aging and a voltage inspection.

Figure 3:
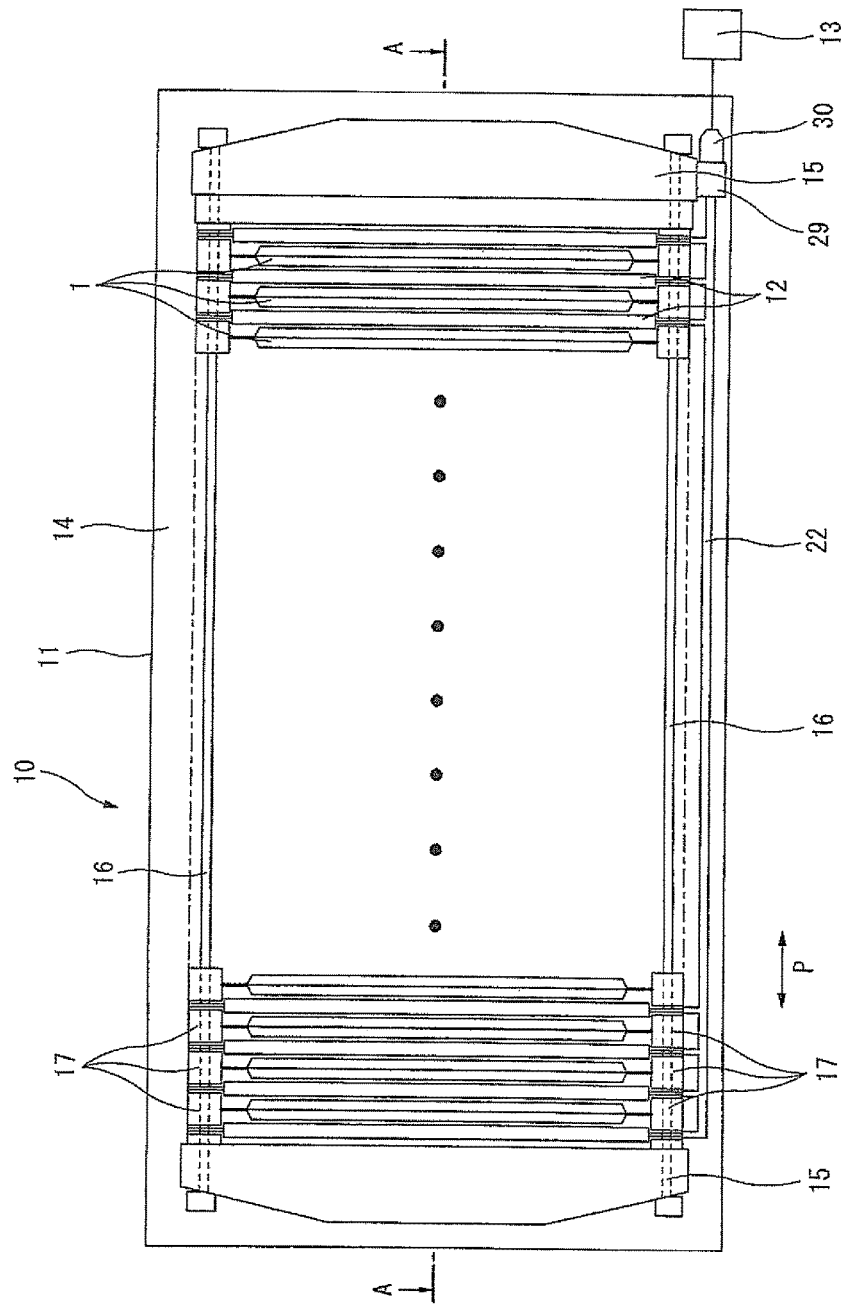
FIG. 3 is a top view showing the pressurization device according to a first embodiment.
Figure 4:
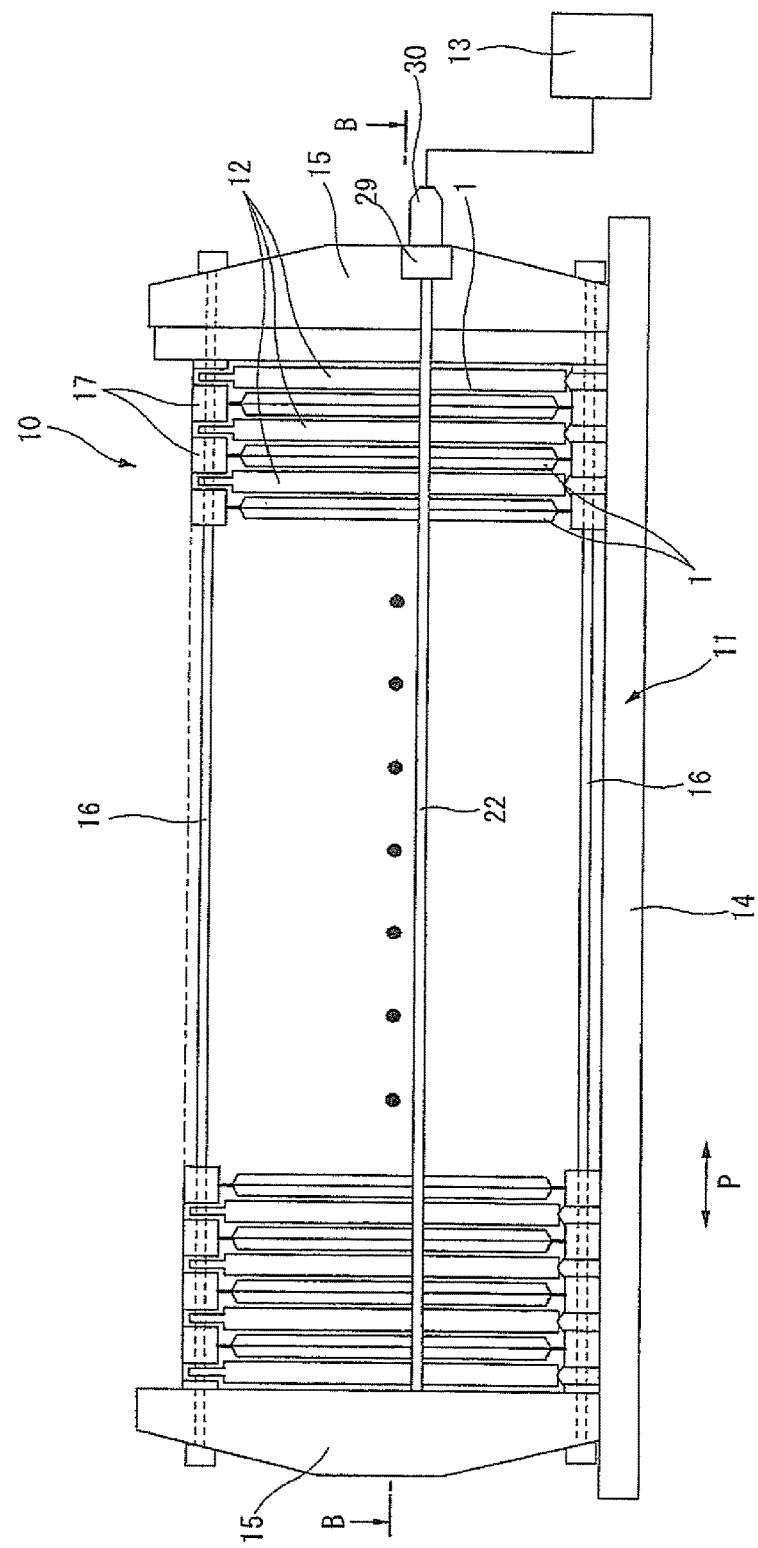
FIG. 4 is a side view of the above pressurization device.

FIG. 3 and FIG. 4 show a first embodiment of pressurization device 10 forming a main part of the present invention. In addition, in the following explanation, the above film exterior battery 1 is called as battery cell 1. This pressurization device 10 has housing 11 accommodating a plurality of battery cells 1 and a plurality of spacers 12 fixed to housing 11 at predetermined even intervals in thickness direction P of battery cells 1 and forming bag shapes capable of expanding and contracting in at least the above thickness direction P in accordance with air pressure (fluid pressure) of air as working fluid sealed inside the spacers. In addition, air apparatus 13 as a fluid pressure source which is capable of adjusting the air pressure inside the plurality of spacers 12 is equipped at the outside of housing 11.

Housing 11 has base plate 14 having a flat rectangular plate shape, which becomes a friction surface for when housing 11 is carried by a conveyor, and a pair of fixed plates 15 erected at both end portions in the rectangular direction of this base plate 14. The plurality of spacers 12 are disposed at predetermined even intervals between the pair of these fixed plates 15.

When the plurality of battery cells 1 are pressurized, fixed plates 15 receive the load of the whole of them, and they are therefore thicker than spacer 12 and firmly fixed to base plate 14.

Guide shafts 16 bridged between both of the fixed plates 15 are fixed to respective four corners of each of fixed plates 15. Each of spacers 12 is supported by these guide shafts 16 so as to slide in thickness direction P. As to this guide shaft 16, each cylindrical bush 17 is inserted between spacers 12 so that each pitch between adjacent spacers 12 is made constant. That is, bushes 17 and spacers 12 are alternately provided in contact with each other on guide shafts 16, and the whole of them is sandwiched by fixed plates 15 provided at both of the end portions in the rectangular direction of base plate 14. With this, the plurality of spacers 12 are fixed at even intervals between the pair of fixed plates 15. In addition, each of spacers 12 can be directly fixed to housing 11 at even intervals.

In addition, air pipe 22 extending parallel to guide shaft 16 is disposed at the side portion of housing 11 as a pressure supply passage. By this air pipe 22, as mentioned below, the air is supplied to each of spacers 12 from air apparatus 13. Check valve 29 is provided at the base end of air pipe 22 to check backflow of the air introduced into spacers 12. Air pipe 22 is connected to air apparatus 13 through joint 30 detachably connected to this check valve 29. In addition, check valve 29 is opened by engaging an opening jig, which is not shown in the drawings, and air bleeding from spacers 12 becomes possible.

Figure 5:
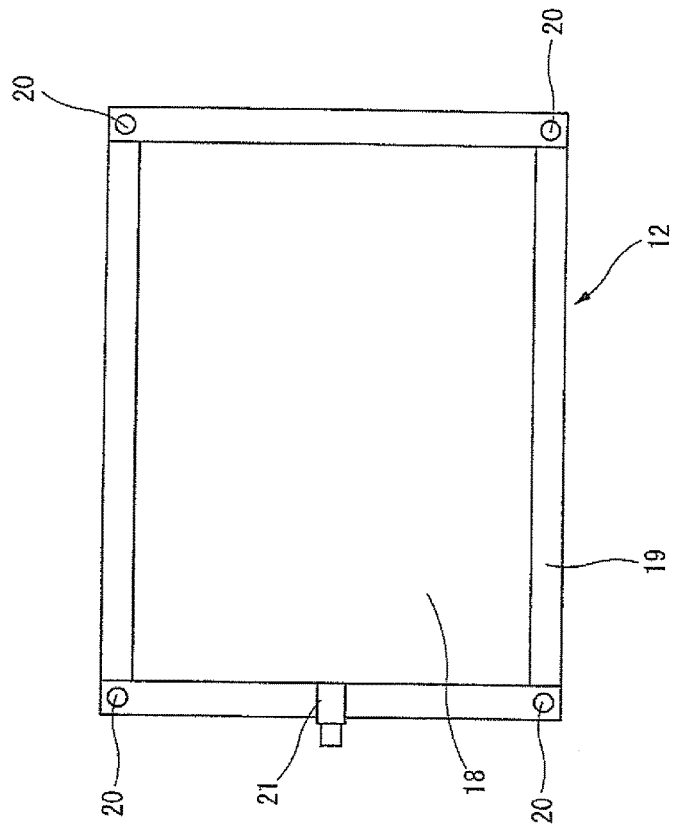
FIG. 5 is a front view (A) and a side view (B) showing a spacer of the above pressurization device.
Figure 5:
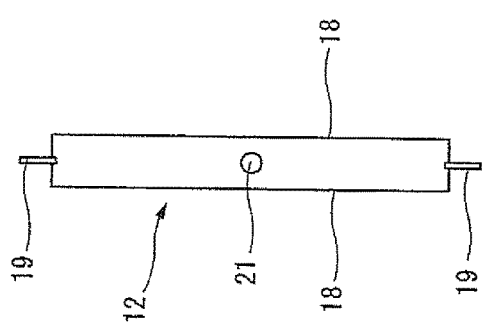

As shown in FIG. 5, each of both of the side surfaces of spacer 12 in the thickness direction has a flat shape. These flat surfaces serve as pressurization surface 18 which pressurizes both of the side surfaces of battery cell 1 in thickness direction P. A material which is capable of expanding and contracting in the thickness direction, and which becomes hardly in a state of being stretched even if it is repeatedly used is used for spacer 12. For example, as a material of spacer 12, there is used a rubber sheet including a fabric fiber on a part of at least pressurization surface 18.

In addition, spacer 12 forms a bag shape into which the air can be introduced. In this embodiment, spacer 12 has a shape in which two rubber sheets are joined to each other at peripheral edge portion 19. Each through-hole 20 through which the above guide shaft 16 is slidably inserted is formed at the four corners of peripheral edge 19. In addition, as to peripheral edge 19, it can be formed into a plate shape having rigidity improved by increasing the hardness of the rubber itself, or another rectangular flame made of a hard synthetic resin or a metal can be attached to the rubber sheet. As to spacer 12, air introducing port 21 which is capable of introducing and discharging the air inside spacer 12 is provided on peripheral edge portion 19 of a short side facing sideways in a state in which spacer 12 has been attached to housing 11.

Figure 6:
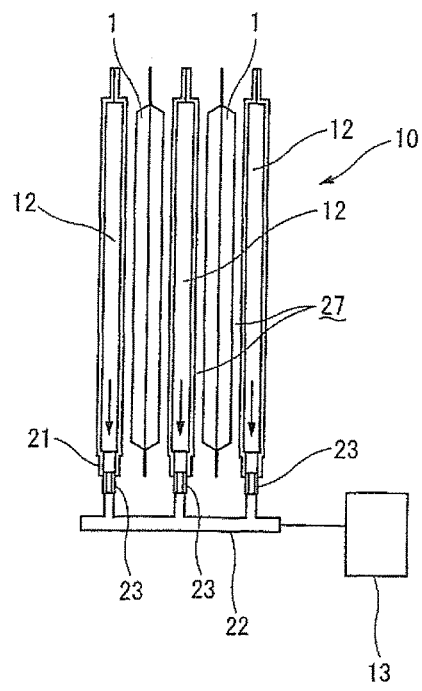
FIG. 6 is a sectional view of a main part taken along line B-B of FIG. 4 showing a contracted state (A) and an expanded state (B) of the above spacer.
Figure 6:
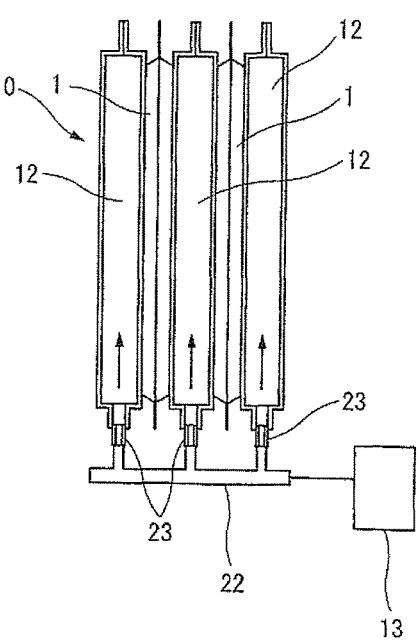

As shown in FIG. 6, air introducing port 21 of each of spacers 12 is connected to the above air apparatus 13 through air pipe 22. Joint 23 for connecting the air pipe is attached to a connection portion between air pipe 22 and air introducing port 21. The supply and the discharging of the air inside spacers 12 are performed by air apparatus 13 through air pipe 22. Here, air pipe 22 has a hollow shape and is extended in thickness direction P. Air pipe 22 is fixed to housing 11, and the plurality of spacers 12 are connected at predetermined even intervals. In addition, air pipe 22 can be provided at the lower surface side of housing 11, for example, at the inside of base plate 14.

Figure 7:
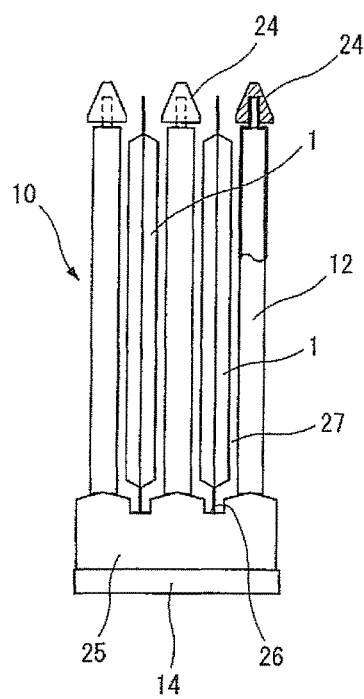
FIG. 7 is also a sectional view of a main part taken along line A-A of FIG. 3 showing the contracted state (A) and the expanded state (B) of the above spacer.
Figure 7:
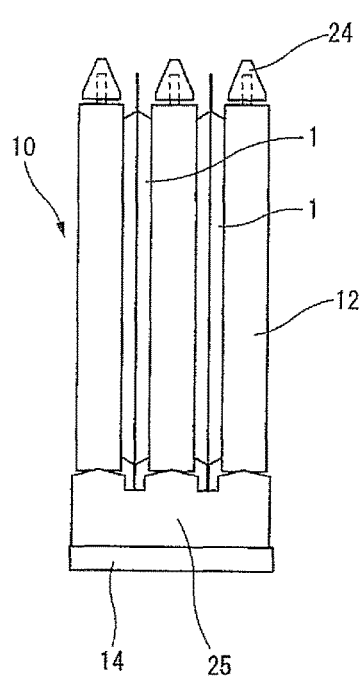

In addition, as shown in FIG. 7, lower guide flame 25 in which concave portions 26 are formed to accommodate the peripheral edge portions of battery cells 1 is provided at the lower edge portion of spacer 12, that is, an edge portion of the opposite side to a side into which battery cell 1 is inserted.

In addition, as shown in FIG. 7, upper guide flame 24 having a cross-sectional tapered shape that is tapered off toward a direction opposite to the insertion direction of battery cell 1 (that is, upper direction) can be additionally provided at the upper edge portion of each of spacers 12, that is, at the edge portion on the side from which battery cell 1 is inserted. In a case where peripheral edge portion 5*a* (laminate welded portion) of battery cell 1 is bent, by this upper guide flame 24, battery cell 1 can be also inserted into space 27 provided between spacers 12 easier without being caught in spacer 12.

Next, pressurization work using this pressurization device 10 is explained with FIG. 6 and FIG. 7.

First, battery cells 1 are inserted into housing 11. When battery cells 1 are inserted into housing 11, as shown in FIG. 6 (A) and FIG. 7 (A), the air is not supplied into spacers 12, and spacers 12 are made to be in a contracted state. With this, each of spaces 27 larger than the dimensions of battery cells 1 in thickness direction P is maintained between adjacent spacers 12, and battery cells 1 can be easily inserted by a robot hand, etc. After inserting battery cells 1, housing 11 is carried to a pressurization step. When housing 11 arrives at a predetermined pressurization step, first, air apparatus 13 and air pipe 22 are connected with joint 30.

In the pressurization step, in a state in which battery cells 1 have been inserted into housing 11, as shown in FIG. 6 (B) and FIG. 7 (B), the air is supplied to each of spacers 12, and spacers 12 are made to be in an expanded state by increasing the air pressure inside spacers 12. With this, battery cells 1, each of which is arranged between adjacent spacers 12, are pressurized in the thickness direction. After completing the pressurization of battery cells 1, air apparatus 13 is stopped, and joint 30 is removed from check valve 29. The pressurized state of battery cells 1 is kept by check valve 29 even after removing joint 30.

Housing 11 is carried to the next charging step, and a predetermined charging of battery cells 1 is performed under this pressurized state. After that, housing 11 is carried to a storage rack, which is not shown in the drawings, in this pressurized state, and the aging of battery cells 1 is performed for, for example, several days.

When battery cells 1 are taken out from housing 11 after finishing the aging, check valve 29 is opened and the air is discharged, and spacers 12 are contracted again. With this, spaces 27, each of which is between adjacent spacers 12, become larger than the thickness of battery cells 1, and thereby battery cells 1 can be easily extracted from pressurization device 10 by a robot hand, etc.

As the above, in the present invention, there is configured that battery cells 1 are pressurized by expanding spacers 12 alternately arranged with battery cells 1, and thereby the position of each of battery cells 1 (a middle position in the thickness direction or positions of terminals 2 and 3) with respect to housing 11 can always be obtained at the same position regardless of the thickness of battery cells 1 to be pressurized. With this, for example, the position of each of the chuck portions of a charging and discharging device with respect to the position of each of various types of the battery cells 1 having different thickness is not shifted, and the pressurization of battery cells 1 using the same pressurization device can therefore be performed. That is, by the same pressurization device 10 (in other words, the same housing 11), it becomes possible to correspond to the various types of battery cells 1 having different thickness.

In addition, in the above pressurization device 10, basically, all the same type (same thickness) of the plurality of battery cells 1 are accommodated in one housing 11. However, as to housing 11 of pressurization device 10 of the above first embodiment, the plurality of spacers 12 are fixed to housing 11 at even intervals, and an expected pressurization can therefore be possible while keeping battery cells 1 at even intervals even if the thickness of some of battery cells 1 in the plurality of battery cells 1 is different.

Figure 8:
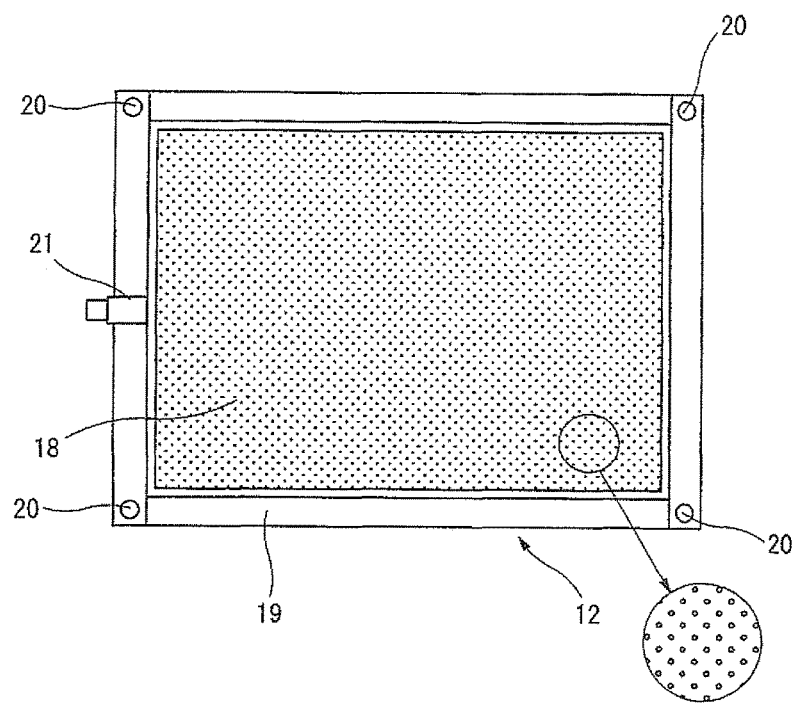
FIG. 8 is a front view of the spacer showing a modification of the spacer in which fine recesses and projections are provided on the surface of a pressurization surface.

Next, FIG. 8 shows a modification of the spacer in which the surface of pressurization surface 18 of the above spacer 12 is made into a rough surface. For example, fine recesses and projections are provided on the surface of pressurization surface 18 made of a rubber sheet including a fabric fiber, and thereby suppressing sticking of pressurization surface 18 to battery cell 1 caused by the pressurization of spacer 12. That is, since exterior body 5 of battery cell 1 is made of a smooth laminated film, for example, if pressurization surface 18 of spacer 12 made of the rubber sheet is a smooth surface not having the recesses and projections, there is a fear about that battery cell 1 and pressurization surface 18 are stuck together at the time of the pressurization. By forming pressurization surface 18 into a surface having a fine evenness, that is, a rough surface like the present embodiment, the sticking can be suppressed In the embodiment shown in the drawing, the uneven surface is formed by arranging a plurality of spherical fine projections. However, conversely, a plurality of fine recessed portions can be arranged. The fine recesses and projections for making the rough surface can be regularly arranged at even intervals, or can be arranged irregularly. In addition, if the rough surface is a surface having recesses and projections arranged in a lattice shape or a surface on which an irregular embossed pattern is formed, which is capable of suppressing the sticking of pressurization surface 18 to the laminated film, any shapes can be used. However, if the sizes and the steps of individual recesses and projections are excessively large, when battery cells 1 are pressurized by the expansion of spacers 12, the recesses and projections of pressurization surface 18 are transferred onto the laminated film, and it is not desirable for the quality of battery cell 1. Therefore, it is desirable that the recesses and projections are made to be sufficiently fine so that the sticking is suppressed and the transferring onto the laminated film does not occur.

Next, a further modification of spacer 12 is explained based on FIG. 9 to FIG. 13. As mentioned above, in a case where the same housing 11 is used for various types of battery cells 1 having different thickness, spaces 27, each of which is maintained between adjacent spacers 12 in the contracted state of spacers 12, is set in correspondence with battery cell 1 having the thickest thickness in the estimated types of battery cells 1. Therefore, conversely, with respect to battery cell 1 having a thin thickness, a gap in thickness direction P becomes excessive, and, in a step before the pressurization at the time when each of battery cells 1 is inserted between spacers 12 or in a pressure release step before taking battery cells 1 out, there arises a fear about that battery cell 1 leans toward one side in thickness direction P.

Figure 9:
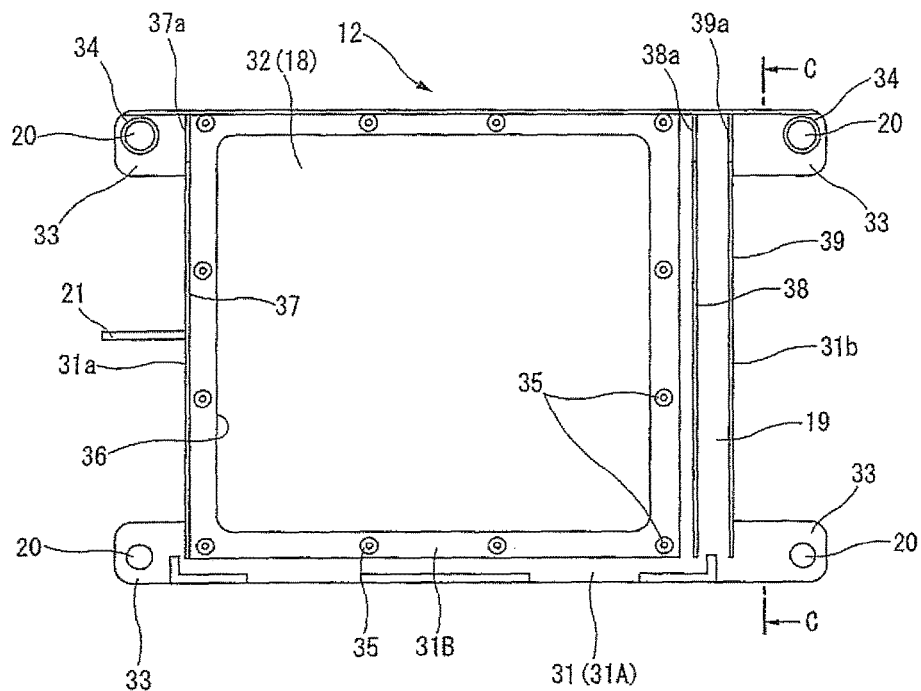
FIG. 9 is a front view of the spacer showing a modification of the spacer in which cell supporting portions are equipped.
Figure 10:
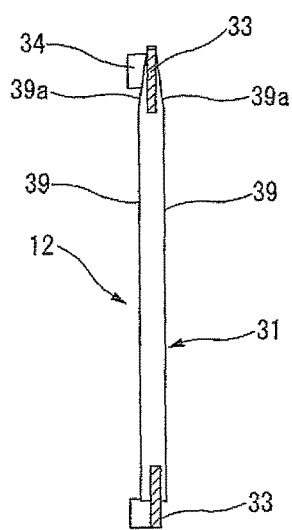
FIG. 10 is a sectional view taken along line C-C of FIG. 9.

Spacer 12 shown in FIG. 9 and FIG. 10 is one formed to suppress the leaning of battery cell 1 in space 27. Specifically, this spacer 12 is formed of rectangular flame 31 forming peripheral edge portion 19 and rubber sheet 32 formed into a bag shape formed by joining and holding the peripheral edge of overlapped two rubber sheets by this flame 31. Rubber sheet 32 exposed inside rectangular opening portion 36 of flame 31 forms pressurization surface 18. The size of this opening portion 36, that is, the size of pressurization surface 18 is set slightly larger than that of the projection surface of middle part 5b accommodating electrode laminated body 4 of battery cell 1.

Flame 31 is made of a hard synthetic resin and formed into a rectangular plate shape having the above opening portion 36. Projection piece 33 projecting sideways is equipped at each of the four corners of flame 31, and the above-mentioned through-hole 20 for guide shaft 16 is formed in each of projection pieces 33. In addition, through-holes 20 in a pair of upper side projection pieces 33 are integrally equipped with cylindrical portions 34 serving the above-mentioned bush 17. Flame 31 is formed of two members of main body portion 31A integrally equipped with projection pieces 33 and relatively narrow flame-shaped retainer 31B formed along the periphery of opening portion 36, which are not shown in the drawings in detail. Rubber sheets 32 are sandwiched between them and integrally joined each other by a plurality of rivets 35 or screws. In addition, as mentioned above, the rubber sheet including the fabric fiber and the rubber sheet whose surface is formed into the rough surface can be used.

As shown in FIG. 9, flame 31 is left-right asymmetry in consideration of the projection direction of terminals 2 and 3 in battery cell 1. A distance between end edge 31b on the right side of FIG. 9 and opening portion 36 is larger as compared with a distance between end edge 31a on the left side of FIG. 9 and opening portion 36. Air introducing port 21 used for introducing the air into rubber sheet 32 forming the bag shape or for discharging the air from it is provided at end edge 31a on the left side of FIG. 9.

In addition, cell supporting portions 37, 38 and 39 projecting in thickness direction P from each of the front and the back surfaces of flame 31 are respectively formed on three places of flame 31 in the width direction of spacer 12. Specifically, cell supporting portion 37 extending in a vertical direction along end edge 31a on the left side of FIG. 9 is formed, and cell supporting portion 39 extending in the vertical direction along end edge 31b on the right side of FIG. 9 is formed. Furthermore, cell supporting portion 38 extending parallel to cell supporting portion 39 is formed between end edge 31b on the right side of FIG. 9 and opening portion 36. The shapes of these cell supporting portions 37, 38 and 39 are substantially the same shape when viewed from the direction shown in FIG. 10, and are long thin wall shapes or rib shapes along the vertical direction, that is, along the insertion direction of battery cell 1. In addition, their upper end portions 37a, 38a and 39a are formed into tapered shapes tapering off upwards.

In addition, three cell supporting portions 37, 38 and 39 are formed on each of the front and the back surfaces of flame 31. FIG. 10 shows a pair of cell supporting portions 39 positioned back to back, which are provided on the respective front and the back surfaces of flame 31.

Figure 11:
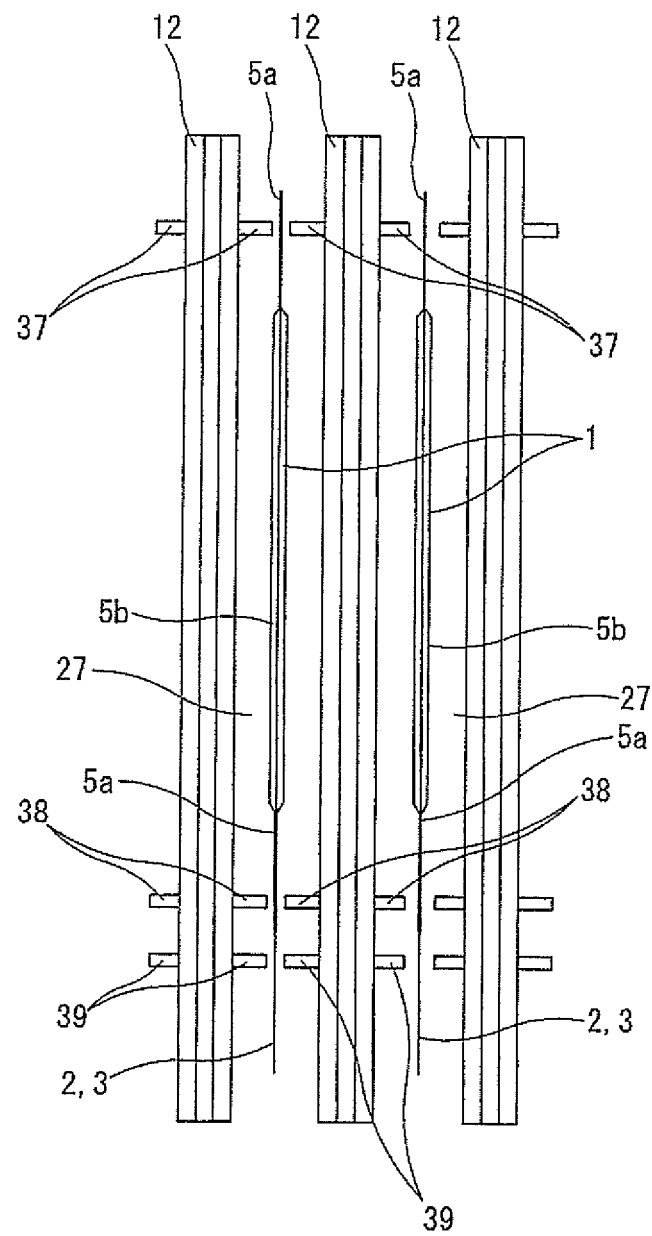
FIG. 11 is an explanation drawing showing a state in which the spacers each equipped with the cell supporting portions, spacers have been in the contracted state, have been combined with the battery cells having a thin thickness, when viewed above.

FIG. 11 shows a state in which each of relatively thin thickness battery cells 1 has been inserted between adjacent spacers 12 of the plurality of spacers 12 in each of which cell supporting portions 37, 38 and 39 are equipped as the above, when viewed from above housing 11. In addition, spacers 12 are in the contracted state. As shown in FIG. 11, when battery cell 1 is inserted between spacers 12, two cell supporting portions 37 and 38 positioned at both sides of opening portion 36 are opposed to peripheral edge portion 5a of exterior body 5 of battery cell 1, that is, they are opposed to the heat-welded part of the laminated film. Cell supporting portions 37 and 38 provided in each of two adjacent spacers 12 are not in contact with each other, and a space into which peripheral edge portion 5a of exterior body 5 can be easily inserted is maintained between them. The space between cell supporting portions 37 and the space between cell supporting portions 38 are smaller than space 27 between two spacers 12 in a part other than the space between cell supporting portions 37 and the space between cell supporting portions 38. Therefore, even if the thickness of middle portion 5b of battery cell 1 is thin, the leaning of battery cell 1 inside space 27 is suppressed. That is, if battery cell 1 leans, peripheral edge portion 5a of exterior body 5 comes in contact with cell supporting portions 37 and 38, and its leaning is thus restricted.

In addition, as shown in FIG. 11, the other cell supporting portion 39 positioned apart from opening portion 36 is opposed to terminals 2 and 3 led out from exterior body 5 of battery cell 1. Therefore, the positions of terminals 2 and 3 made of metal foils are regulated from both sides. In addition, this cell supporting portion 39 corresponds to "second cell supporting portion".

Here, in the above embodiment, cell supporting portions 37, 38 and 39 are continuously formed into rib shapes in the vertical direction, and upper end portions 37a, 38a and 39a are formed into inclined surfaces having tapered shapes. Therefore, when battery cell 1 is inserted, peripheral edge portion 5a of exterior body 5 and terminals 2 and 3 are smoothly guided, and are surely inserted between cell supporting portions 37, between cell supporting portions 38 and between cell supporting portions 39 provided on each of a pair of spacers 12 opposed to each other, and thereby surely suppressing the deformation of terminals 2 and 3 at the time of the insertion.

Figure 12:
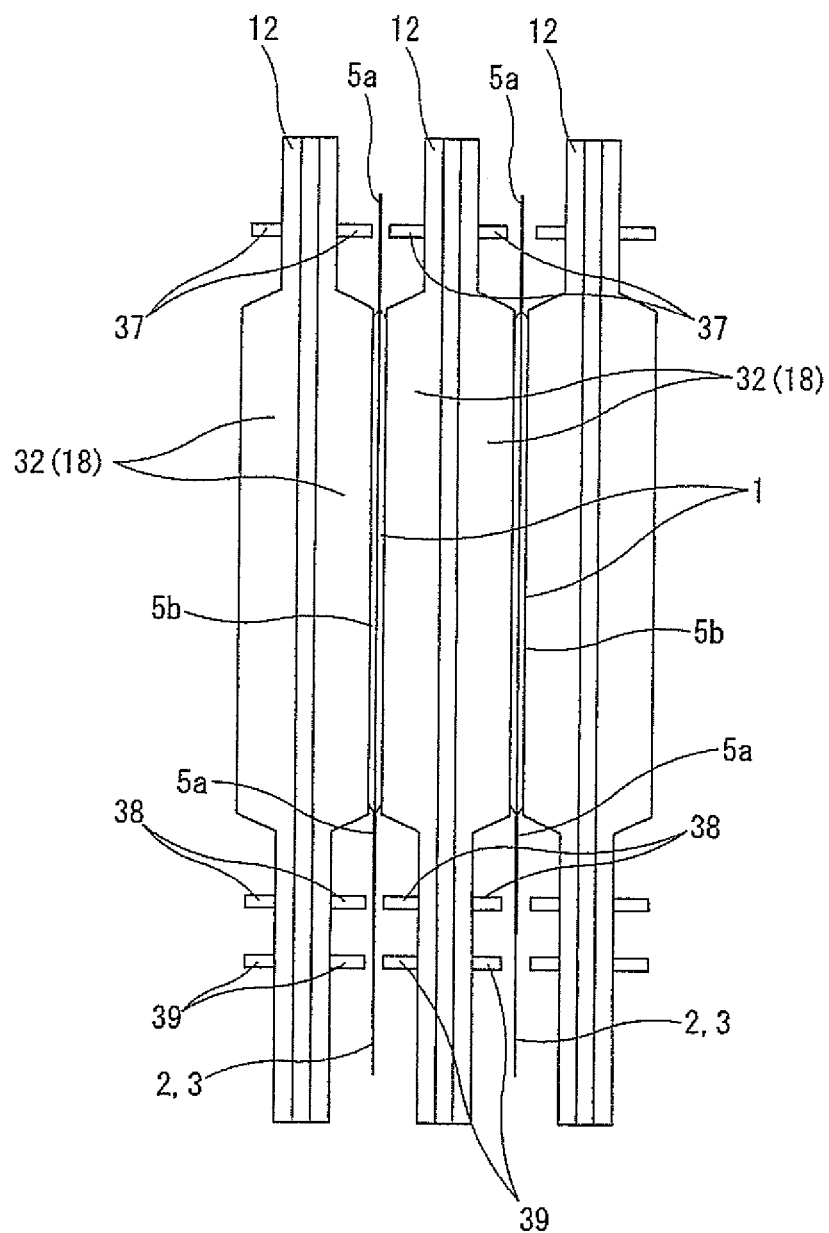
FIG. 12 is also an explanation drawing in the expanded state of the spacers.

FIG. 12 shows a state in which spacers 12 have been expanded after inserting battery cells 1 as the above. As shown in the drawing, rubber sheet 32 (pressurization surface 18) positioned inside cell supporting portions 37, 38 and 39 are expanded, and middle part 5b of battery cell 1 (a part accommodating electrode laminated body 4) is pressurized. At this time, cell supporting portions 37, 38 and 39 are provided on peripheral edge portion 19, which is not expanded, of spacer 12, that is, they are provided on flame 31, and these cell supporting portions are therefore not displaced.

Figure 13:
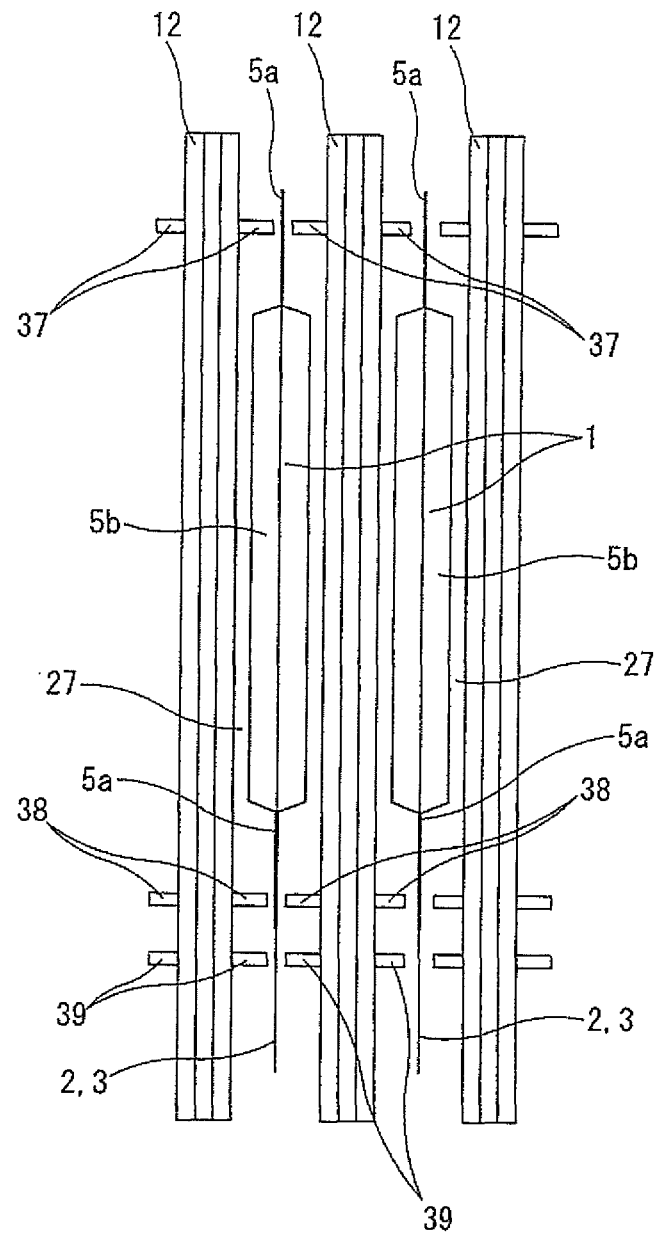
FIG. 13 is an explanation drawing showing a state in which the spacers each equipped with the cell supporting portions, spacers have been in the contracted state, have been combined with the battery cells having a thick thickness, when viewed above.
Figure 14:
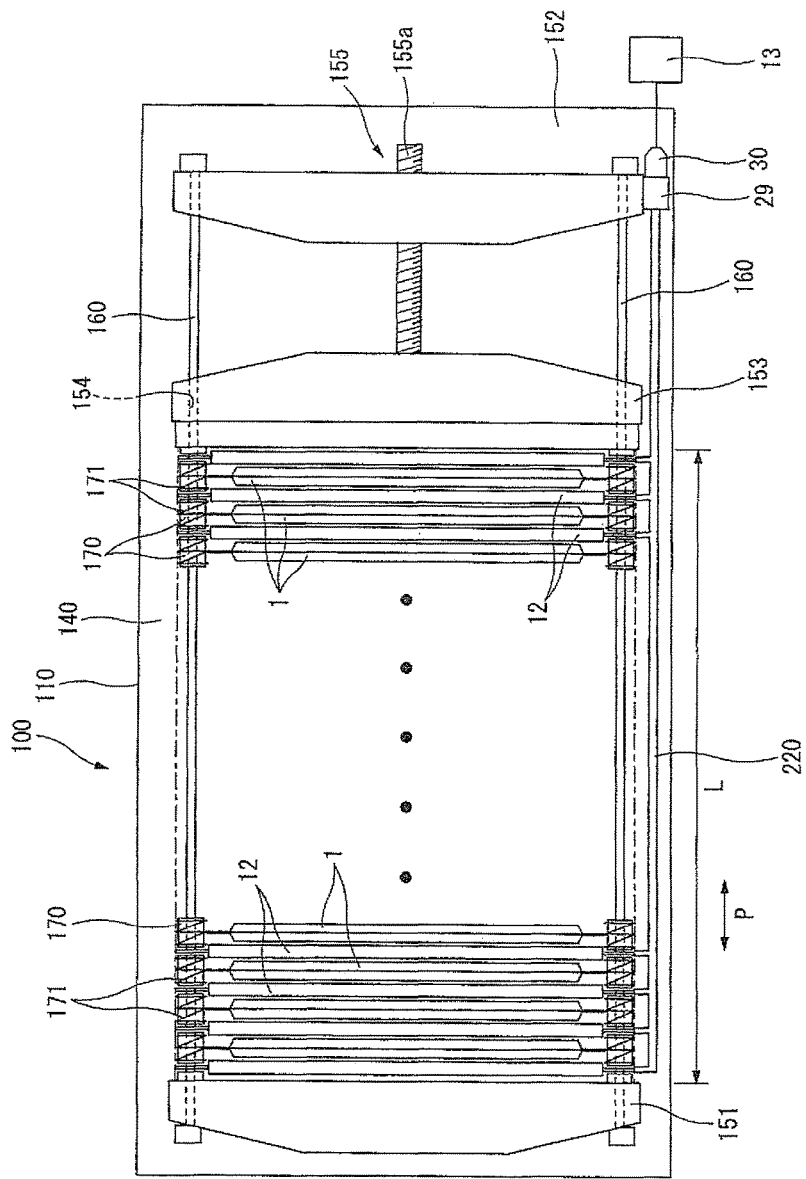
FIG. 14 is a top view showing a second embodiment of the pressurization device.
Figure 15:
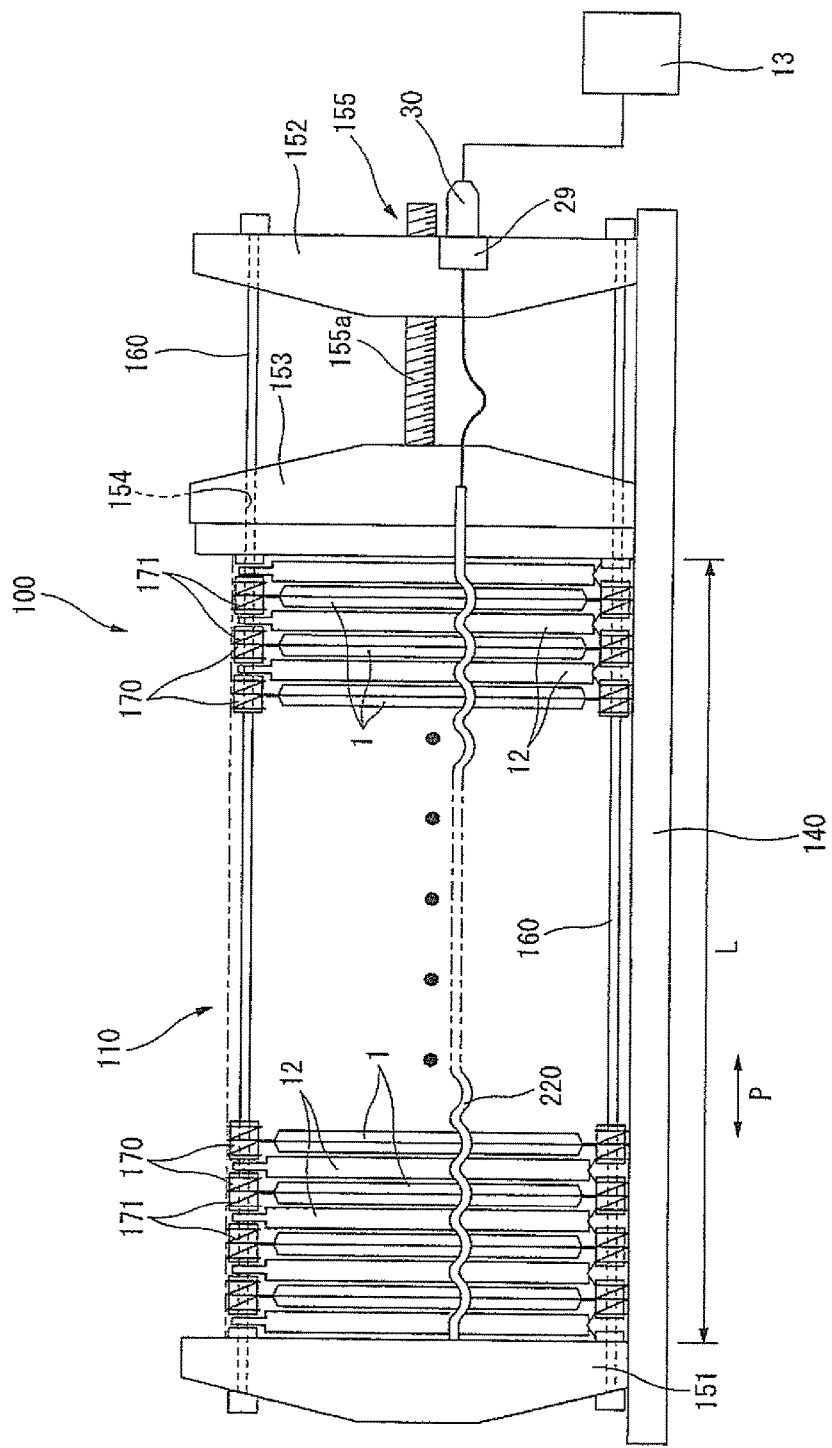
FIG. 15 is a side view of the above pressurization device.

FIG. 13 shows a state in which each of battery cells 1 of which thickness is relatively thick has been inserted between the above spacers 12. In this way, with respect to battery cell 1 of which the thickness of middle part 5b is thick, there is also no hindrance at the time of the insertion because cell supporting portions 37, 38 and 39 are opposed to peripheral edge portion 5a of exterior body 5 outside electrode laminated body 4 and terminals 2 and 3.

In this way, according to pressurization device 10 using spacer 12 equipped with cell supporting portions 37, 38 and 39, since the leaning of battery cell 1 between spacers 12 is restricted even if the thickness of battery cell 1 is thin, there is no hindrance to the insertion and the taking out of the battery cell 1. Therefore, by the same housing 11, it is possible to correspond to various types of battery cells 1 having greatly different thickness.

Next, a second embodiment of pressurization device 100 of the present invention is explained based on FIG. 14 to FIG. 17. In addition, in the following explanation, difference from the first embodiment is mainly explained, and explanation about a part that is basically not different from the first embodiment is omitted.

Housing 110 of pressurization device 100 of this second embodiment has base plate 140, a pair of fixed plates 151 and 152 erected on both end portions of this base plate 140, and movable plate 153 positioned between the pair of fixed plates 151 and 152. In addition, the plurality of spacers 12 are arranged in thickness direction P between fixed plate 151 and movable plate 153.

Guide shafts 160 bridged between both of fixed plates 151 and 152 are fixed to respective four corners of fixed plates 151 and 152. By these guide shafts 160, each of spacers 12 is supported so as to slide in thickness direction P. Individual spacers 12 are especially not different from the spacer of the first embodiment shown in FIG. 5, and can be formed to have a configuration shown in FIG. 8 to FIG. 10.

Through-hole 154 provided in each of four corners of movable plate 153 is slidably fitted with each of guide shafts 160. With this, movable plate 153 is supported so as to slide in thickness direction P by four guide shafts 160. When battery cells 1 are pressurized, this movable plate 153 receives the load of the whole of them, and is formed to have a thick thickness similar to fixed plates 151 and 152 accordingly. Ball screw mechanism 155 for moving movable plate 153 in thickness direction P is provided between movable plate 153 and fixed plate 152 adjacent to movable plate 153.

The above ball screw mechanism 155 is formed of a nut portion (not shown in the drawings) provided in the center portion of fixed plate 152 and screw rod 155a extending along thickness direction P through the nut portion. The tip end of screw rod 155a is rotatably connected to the center portion of movable plate 153. Therefore, by rotationally operating screw rod 155a from the outside, movable plate 153 is moved in thickness direction P along guide shafts 160. With this, distance L between fixed plate 151 and movable plate 153, that is, effective length L of housing 110 in which the plurality of spacers 12 are arranged is changed.

In addition, in guide shafts 160 supporting the plurality of spacers 12, each cylindrical bush 170 is inserted between spacers 12. As to this bush 170, its axial length (that is, a length in thickness direction P) is formed to be relatively short in consideration of a state in which the above effective length L has been minimized. Therefore, in a state in which effective length L has been longer than minimized effective length L, bush 170 becomes in a state of being separated from at least one of the pair of adjacent spacers 12. In addition, this bush 170 can be integrally formed with spacer 12.

In addition, coil spring 171 is inserted around and fitted to each of the circumferences of bushes 170, and each of both ends of coil spring 171 is brought into contact with spacers 12 by pressurization. That is, each coil spring 171 is positioned between two spacers 12 in an appropriate compressed state as a compression coil spring which acts in the direction of widening space 27 between two adjacent spacers 12. In addition, bush 171 is omitted, and it is possible to configure so as to support coil spring 171 around guide shaft 160. In addition, to surely maintain space 27 between spacers 12, it is desirable that coil springs 171 are provided to all of four guide shafts 160. However, battery cell 1 is inserted into housing 110 from above, and, as to lower side two guide shafts 160, coil spring 171 can therefore be omitted.

Air pipe 220 extending in thickness direction P is disposed at the side portion of housing 110. This air pipe 220 is connected to each of spacers 12 similar to the first embodiment. This air pipe 220 has check valve 29 at its base end. As mentioned above, in a predetermined step, air pipe 220 is connected to air apparatus 13 provided at the outside of housing 110 through joint 30, and the introduction and the discharge of the air are performed. In addition, in this second embodiment, since spacers 12 are moved in thickness direction P with the change in effective length L, a flexible pipe is used for air pipe 220 so as to allow this movement.

Next, the function of the above second embodiment is explained with reference to FIG. 16 and FIG. 17. Pressurization device 100 of this second embodiment is one which is capable of corresponding to the difference of effective length L caused by replacement of some equipment in the manufacturing line of battery cells 1. For example, there is a possibility that the pitches (distance between the terminals along thickness direction P) of a plurality of terminals of the equipment side, which are connected simultaneously to respective terminals 2 and 3 of each of the plurality of battery cells 1, are relatively short in certain equipment, or relatively long in a certain equipment.

Figure 16:
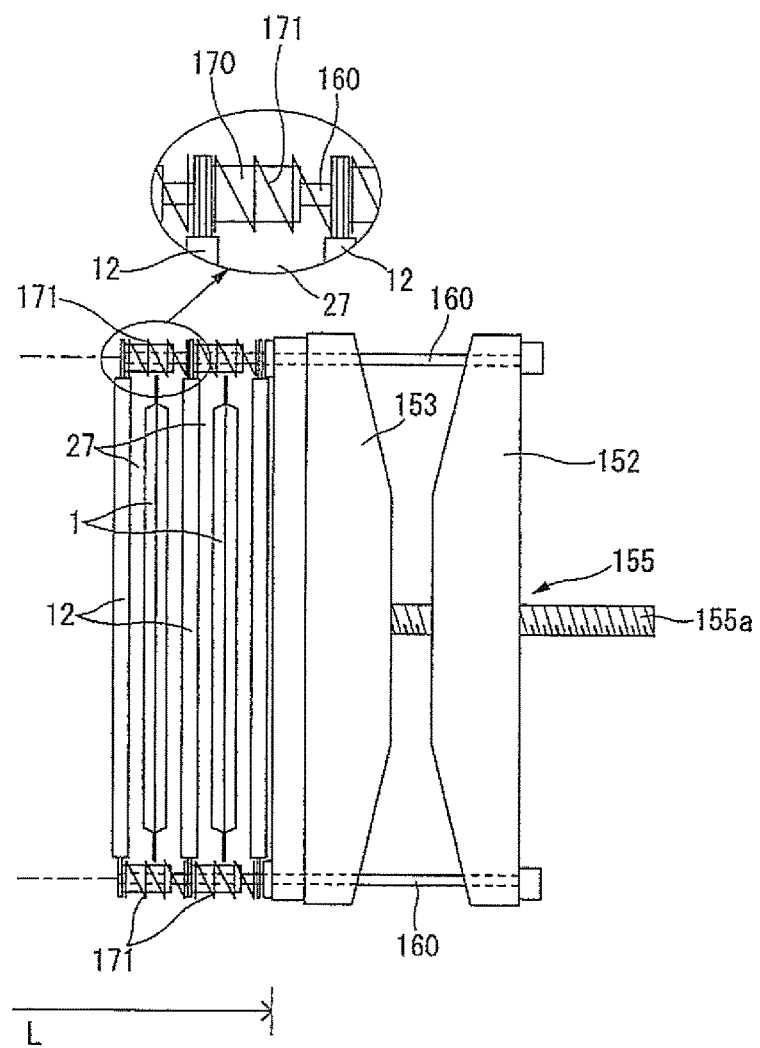
FIG. 16 is an explanation drawing when effective length L of the housing of the second embodiment is set to be long.

For example, in a certain equipment in a step, in a case where relatively long effective length L is required, as shown in FIG. 16, in a step before insertion of battery cells 1 (spacers 12 are in the contracted state), movable plate 153 is positioned at a position relatively close to fixed plate 152. Each of coil springs 171 provided between adjacent two spacers 12 has the same spring force, and spaces 27, each of which is formed between spacers 12, therefore become equal by the balance of the plurality of coil springs 171 arranged in series along guide shaft 160. That is, in effective length L at that time, the plurality of spacers 12 is positioned at even intervals.

In this state, similar to the above-mentioned first embodiment, each of the plurality of battery cells 1 is inserted between spacers 12 and each of spacers 12 is expanded, and thereby the pressurization can be performed. In addition, the plurality of battery cells 1 that are inserted into one housing 110 have basically the same thickness, and the position of each of the battery cells 1 is therefore not changed even in the pressurized state.

Figure 17:
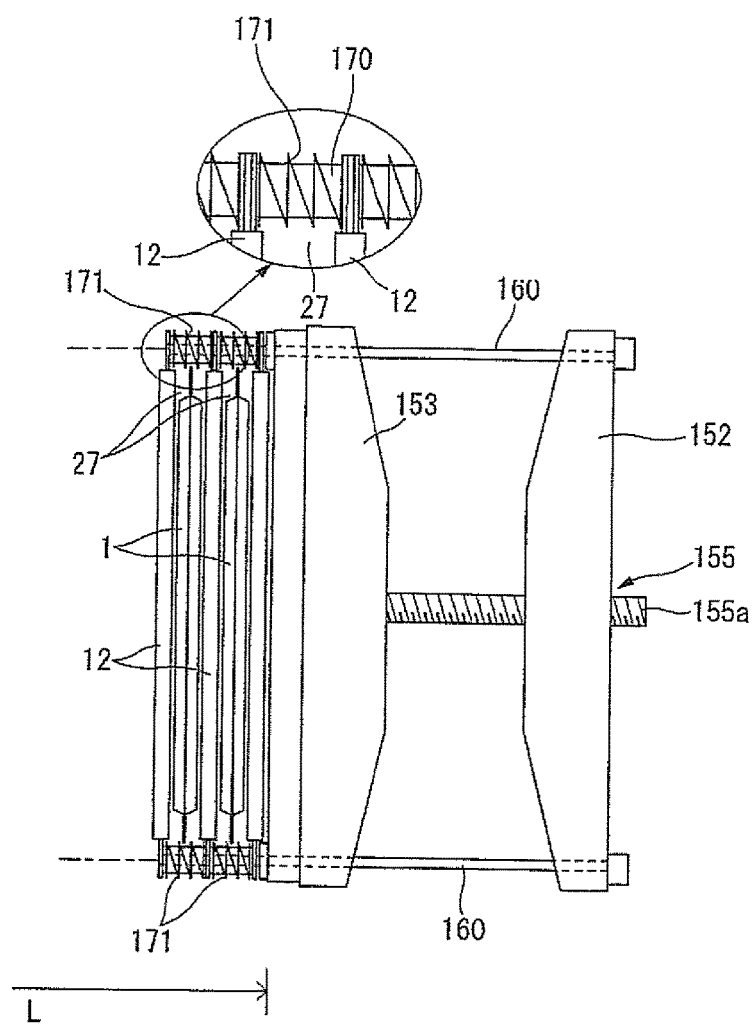
FIG. 17 is an explanation drawing when effective length L of the housing of the second embodiment is set to be short.

In addition, in another equipment, in a case where shorter effective length L is required, in the step before the insertion of battery cells 1 (spacers 12 are in the contracted state), by rotationally operating screw rod 155*a* of ball screw mechanism 155 from the outside, as shown in FIG. 17, movable plate 153 is positioned at a position apart from fixed plate 152. At this time, spaces 27, each of which is formed between spacers 12, become also equal by the balance of the plurality of coil springs 171 arranged in series along guide shaft 160. That is, in effective length L adjusted to be short, the plurality of spacers 12 is positioned at even intervals.

In this state, similar to the above, each of the plurality of battery cells 1 is inserted between spacers 12 and each of spacers 12 is expanded, and thereby the pressurization can be performed. Since the plurality of battery cells 1 have basically the same thickness, the position of each of battery cells 1 is not changed even in the pressurized state.

In this way, for example, in a case where different effective length L is required in some equipment, housing 110 in pressurization device 100 of the second embodiment can easily correspond to it by adjusting the position of movable plate 153. Of course, in a case where required effective length L is different in each of manufacturing lines, by the same housing 110, it is also possible to correspond to all of the manufacturing lines.

In addition, a configuration in which the plurality of spacers 12 are held at even intervals using the springs arranged in series as the above can be also similarly applied to housing 11 of which effective length L is unchangeable like the first embodiment. That is, the coil spring can be interposed like the second embodiment instead of bush 17 of the first embodiment.

The invention claimed is:

1. A pressurization device for battery cells, comprising:
    battery cells stacked in a thickness direction, wherein each of the battery cells has a flat shape in the thickness direction, and wherein each of the battery cells includes:
        an exterior body made of a laminated film; and
        a power generation element sealed with a liquid electrolyte inside the exterior body;
    a housing accommodating the battery cells;
    spacers arranged in the thickness direction, supported by the housing and forming bag shapes which have an expanded state and a contracted state in at least the thickness direction in accordance with fluid pressure of fluid sealed inside the spacers, wherein each of the battery cells contacts at least a portion of an adjacent spacer; and
    a pressure supply passage used for supplying the fluid to the spacers from a fluid pressure source;
        wherein when the spacers are in the contracted state, a space exists between adjacent battery cells, each space having a dimension in the thickness direction that is larger than a thickness of each of the battery cells; and
        when the spacers are in the expanded state, each of the battery cells are pressurized in the thickness direction.

2. The pressurization device for the battery cells according to claim 1, wherein the spacers are fixed to the housing at equal intervals.

3. The pressurization device for the battery cells according to claim 1, wherein the spacers are supported so as to move in the thickness direction by guide shafts of the housing.

4. The pressurization device for the battery cells according to claim 3, comprising:
    springs, wherein each spring is disposed between adjacent spacers and widens a space between the adjacent spacers.

5. The pressurization device for the battery cells according to claim 3, wherein the housing is equipped with a first plate and a second plate opposed to each other along the thickness direction, and a distance between the first plate and the second plate can be adjusted, and
    wherein the spacers are disposed between the first plate and the second plate.

6. The pressurization device for the battery cells according to claim 1, wherein each spacer includes:
    opposing flat pressurization surfaces; and
    a fabric fiber on each of the opposing flat pressurization surfaces, wherein each of the opposing flat pressurization surfaces comes into contact with a corresponding one of the battery, cells to suppress the fabric fiber from being in a stretched state.

7. The pressurization device for the battery cells according to claim 1, wherein each of the spacers includes:
    opposing flat pressurization surfaces, wherein each of the opposing flat pressurization surfaces comes into contact with a corresponding one of the battery cells, and wherein each of the opposing flat pressurization surfaces are formed into a surface having recesses and projections.

8. The pressurization device for the battery cells according to claim 1, wherein each of the spacers is provided with a guide flame which is tapered off toward a direction opposite to an insertion direction of each of the battery cells, wherein the guide flame is provided at an edge portion of each of the spacers on a side into which a corresponding one of the battery cells is inserted.

9. The pressurization device for the battery cells according to claim 1, comprising:
    a pressure adjusting unit including a hollow-shaped pipe fixed to the housing that extends in the thickness direction, wherein the spacers are connected to the pipe at equal intervals.

10. The pressurization device for the battery cells according to claim 1, wherein each of the spacers is equipped with first battery cell supporting portions that are opposed to the exterior body in a position outside the power generation element of each of the battery cells along the thickness direction, and wherein the first battery cell supporting portions are provided at a peripheral edge portion of each of the spacers that is not expanded.

11. The pressurization device for the battery cells according to claim 10, wherein each of the spacers are equipped with a second cell supporting portion opposed to plate-shaped terminals along the thickness direction, which are led out from the exterior body.

\* \* \* \* \*